United States Patent
Harlan et al.

[15] 3,640,325
[45] Feb. 8, 1972

[54] PLATE SKINNING MACHINE

[72] Inventors: Martin L. Harlan, Grand Rapids; Jerry L. Davis, Rockford; Lloyd A. Nyland, Macatawa, all of Mich.

[73] Assignee: Wolverine World Wide, Inc., Rockford, Mich.

[22] Filed: July 22, 1970

[21] Appl. No.: 57,189

[52] U.S. Cl. ........................................... 146/241, 146/130
[51] Int. Cl. .......................................................... A22c 17/12
[58] Field of Search .......................................... 146/130, 241

[56] References Cited

UNITED STATES PATENTS 3,550,660  12/1970  Krause et al. .......................... 146/241
3,559,707  2/1971  Townsend .............................. 146/130

*Primary Examiner*—Willie G. Abercrombie
*Attorney*—Price, Heneveld, Huizenga & Cooper

[57] ABSTRACT

This specification describes a plate-type skinning machine for animal sides, with a unique arrangement and mounting of blade and pressure roller apparatus.

16 Claims, 8 Drawing Figures

PLATE SKINNING MACHINE

BACKGROUND OF THE INVENTION

This invention relates to plate type skinning machines, and more particularly to such skinning machines with special component mounting and arrangement.

In copending application Ser. No. 744,541 entitled Double Side Skinning, now U.S. Pat. No. 3,550,660, is disclosed a novel plate skinning machine found to have certain special advantages, including higher skinning rates, reduced wastage, less gouging, avoidance of skin patches on the meat, and others.

Further development of plate skinning machines for the assignee herein has resulted in the discovery of unique features facilitating ready incorporation of vertical plate skinning machines into high production packing house process lines while also providing important operational flexibilities.

SUMMARY OF THE INVENTION

One particular object of this invention is to provide an improved plate skinning machine with special blade and pressure roller control features.

The blade means controllably shifts at the initiation of the skinning stroke and shortly thereafter in a special fashion obtaining optimum cutting action for maximizing meat removal without damaging the skin. The blade means controllably shifts at the end of the skinning stroke a special fashion causing controlled skin discharge from the machine. The pressure roller means controllably shift for transfer of the severed meat from a retained condition to a discharge condition. The pressure roller means and blade means are cooperably shiftable to a condition allowing blade sharpening and/or removal.

Another object of this invention is to provide a plate skinning machine achieving the above, and suitable for single side or double side skinning.

Another object of the invention is to provide a plate-type skinning machine with a unique double component and double acting mount for each blade.

These and other objects, advantages, and features of this invention will become apparent upon studying the following specification in conjunction with the drawings.

DESCRIPTION OF THE PREFERRED EMBODIMENT

Figure 4:
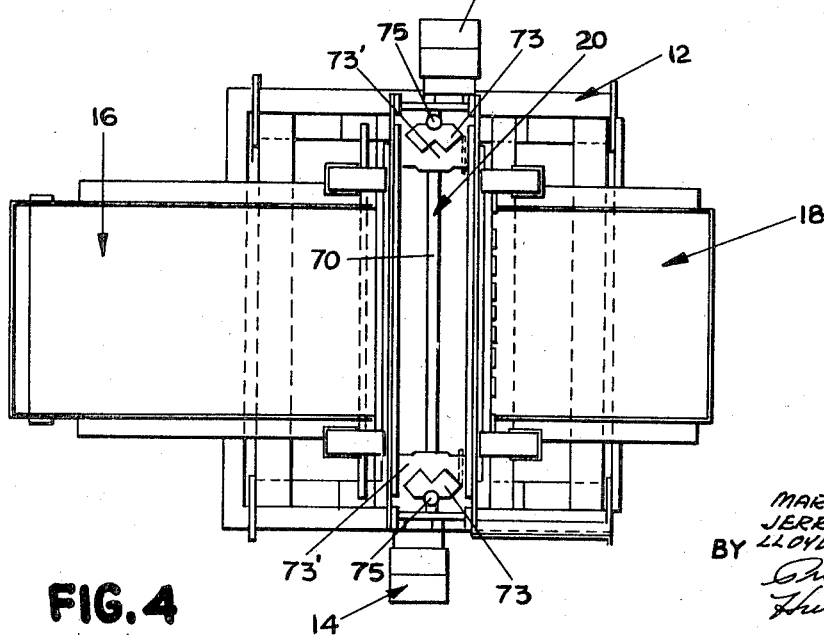
FIG. 4 is a top plan view of the apparatus.

Referring now specifically to the drawings, the complete assembly 10 includes a frame base subassembly 12, an upright frame portion 14 on base 12, infeed conveyor subassembly 16, out-feed conveyor subassembly 18, vertically shiftable, side mounting plate subassembly 20 (FIG. 4), a first blade mount subassembly 22a (FIG. 5) on the infeed conveyor side of the apparatus, a second blade mount subassembly 22b on the out-feed conveyor side of the apparatus, a first pressure roll subassembly 24a on the infeed side, and a second pressure roll subassembly 24b on the out-feed side.

Base 12 of the frame is shown to include a plurality of upright legs 40 which support an elevated platform 42 above the floor surface upon which the structure rests, to support conveyors 16 and 18 at a reasonable working height. Upright frame portion 14 generally extends vertically upwardly in the central portion of the base 12, having a pair of spaced upstanding legs 46 on opposite ends of base 12, interconnected at their upper ends by a crossbeam mechanism 48 to form a generally inverted U-shaped frame member.

Mounted on base 12, generally on opposite sides of the central plane zone of frame 14, is infeed conveyor 16 and out-feed conveyor 18. These may take any suitable form, but preferably are recirculating articulated grids for optimum gripping relationship to animal sides being fed into the machine. Infeed conveyor 16 is powered from a suitable electrical motor-gear box subassembly 50 (FIG. 5) through a suitable belt or chain drive 52 or the like. Conveyor 16 is supported by leg 54. Out-feed conveyor 18 is powered from a motor-gear box subassembly 56 through an endless belt or chain 58. The purpose of infeed conveyor 16 is to advance an animal side, either a single side (i.e., the skin and attached meat and fat back on one side of the backbone line), or a double side (i.e., the skin and attached meat and fat back on both sides of the backbone line).

Since this particular invention was developed relative to the skinning of hog sides, it will largely be explained with respect thereto. It is conceivable however that, within the broader aspects of the invention, it may be employed with other animal sides. Further, although the invention was developed initially for skinning double hog sides, it also is effective for skinning single hog sides. For convenience, the invention will be explained largely with respect to double hog sides.

Infeed conveyor 16 advances the side, with meat up and skin down, to a position above the centrally located, laterally elongated, vertically shiftable feed plate 70 forming the central component of subassembly 20. Preferably, the upper end 70' of plate 70 has a tapered configuration, converging upwardly, for smooth introduction of the side between the skinning blades in a manner to be described in detail hereinafter. Each side edge of plate 70 is suspended by cable means 74. More specifically, a cable attached to the upper edge of each side edge extends upwardly over and around a pulley 76 and downwardly for attachment to the piston of a fluid (e.g., pneumatic) cylinder 78 so that, by contraction of cylinder 78, plate 70 is power elevated from an initial lowered position where its upper edge 70' is beneath the plane of infeed and out-feed conveyors 16 and 18, to an elevated position where it moves upwardly past the pressure roll subassemblies 24a and 24b and the knife subassemblies 22a and 22b. The lower edge of each end of plate 70 also has a cable which extends around the lower pulleys 80 to the lower end of cylinders 78 for power return of plate 70. The piston in cylinder 78 is reversible for lowering of plate 70. The plate is guided to maintain its exact lateral relationship by interfitting of the concave outer faces of its slide bearings 73 on its opposite vertical side edges, with the fixed vertical guide rods 75 (FIG. 4) on the frame. Bearings 73 are mounted to plate 70 by brackets 73'. Preferably an edge clamp 71 (FIG. 5) is vertically shiftable against edge 70' for clamping the animal side thereto, and away therefrom for releasing it by a suitable power cylinder or the like (not shown). The clamp is also shiftable with plate 70 during its stroke.

Pressure roller subassemblies 24a and 24b, and knife subassemblies 22a and 22b are mounted astraddle the vertical plane of travel of plate 70.

Figure 2:
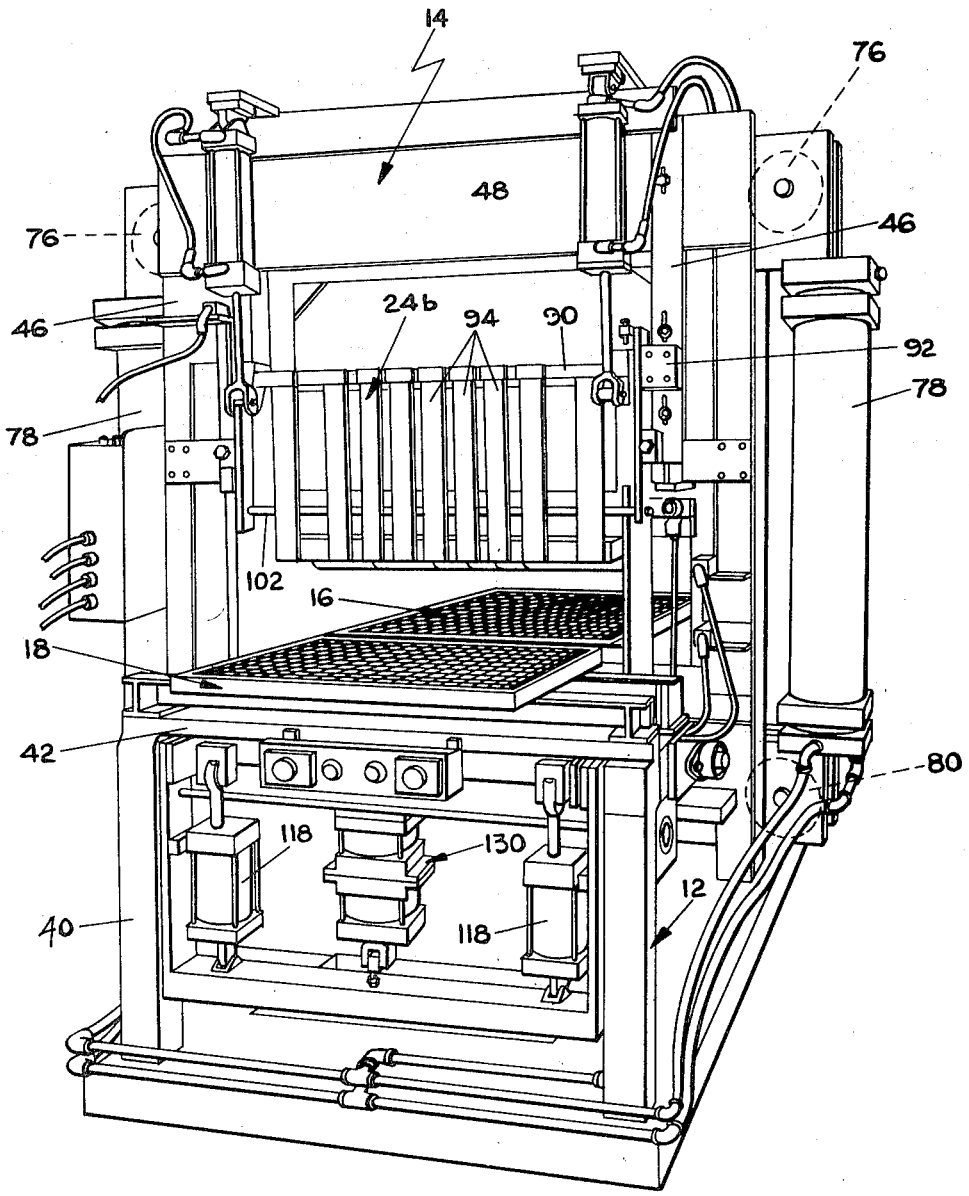
FIG. 2 is a perspective view of the apparatus in FIG. 1, viewed generally from the out-feed or discharge side.
Figure 5:
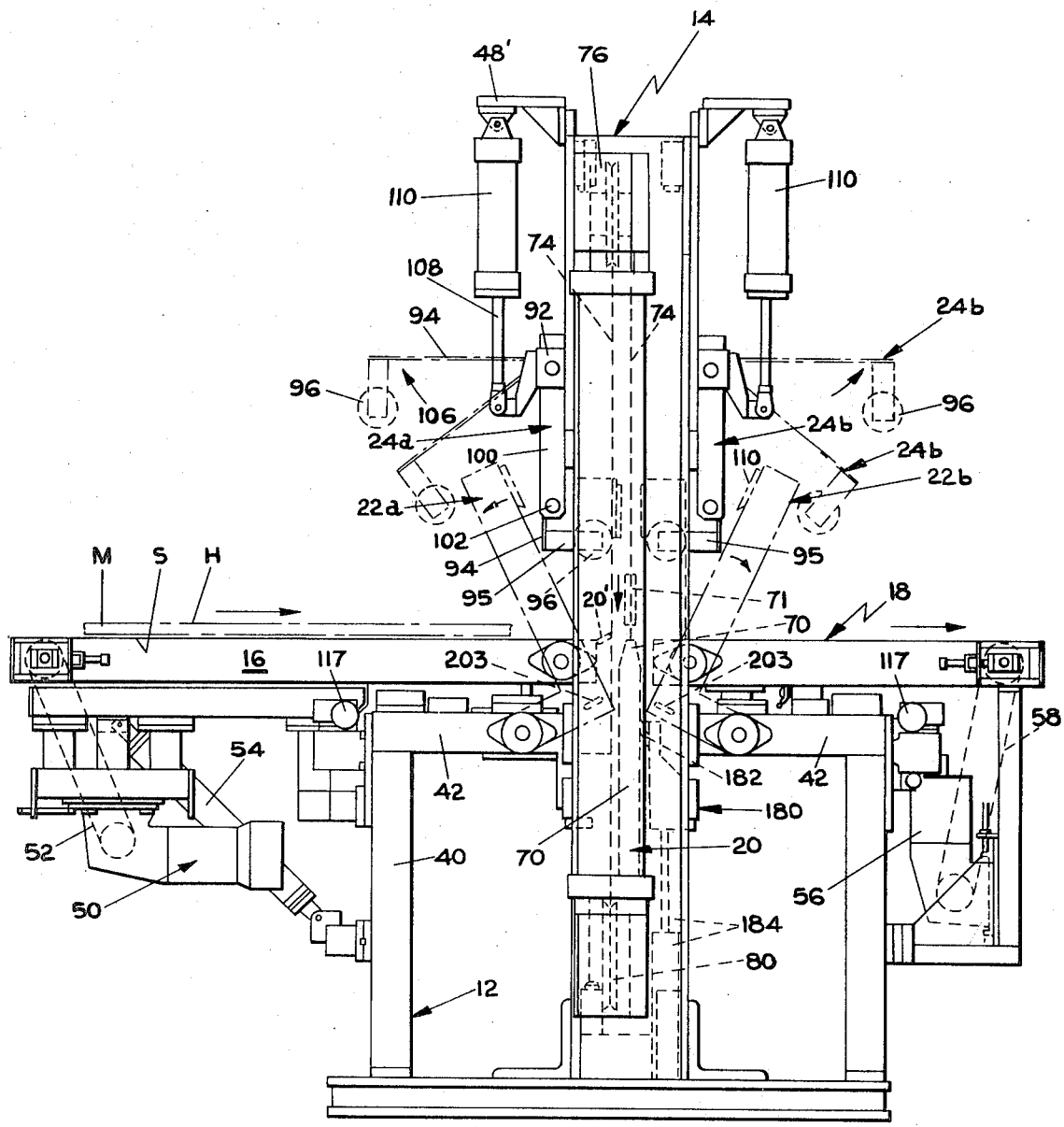
FIG. 5 is an end elevational view of the apparatus, viewed from the opposite end as FIG. 1.
Figure 6:
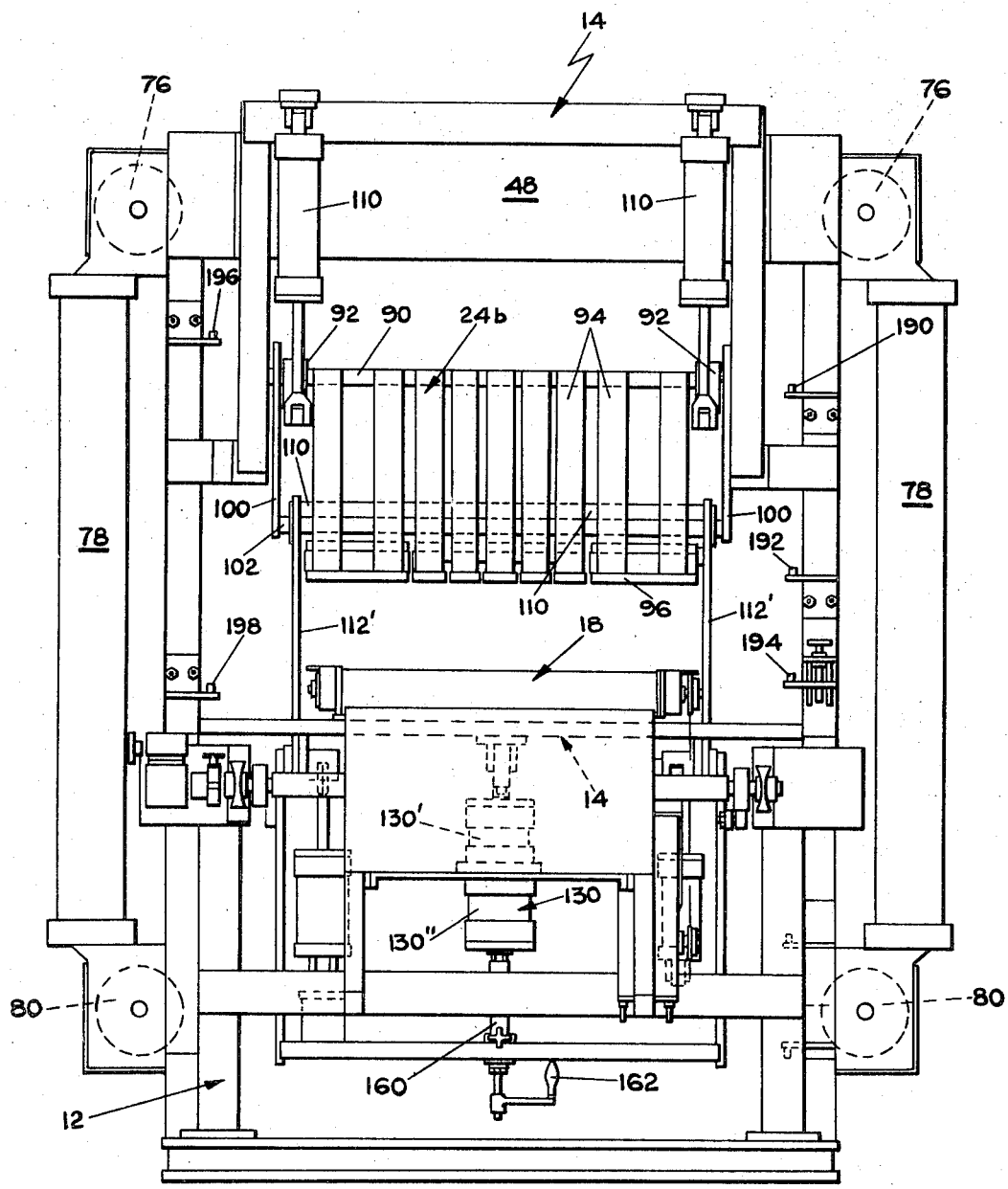
FIG. 6 is a side elevational view of the apparatus, viewed from the discharge side, i.e., from the right side of FIG. 5.

Each of the pressure roll subassemblies 24a and 24b includes an elongated support bar 90 pivotally mounted in bearing blocks 92 at opposite ends thereof to the vertical frame members 46. Attached to member 90 is plurality of leaf spring elements 94 secured at their upper ends to element 90, and having roller elements 96 rotatably mounted to the lower end thereof on brackets 96 extending horizontally inwardly toward the vertical plane of travel of plate 70. Fixedly secured to member 90 at opposite ends thereof is a pair of depending arms 100. Extending between the lower ends of arms 100 is a hoist bar 102 for lifting the leaf springs and rollers when the roller subassembly is elevated as explained more fully hereinafter. Bar 102 is normally in engagement with the leaf springs of the rollers when the latter are in their depending position, illustrated for example in FIGS. 2, 5, and 6. When skinning is taking place, to allow unhindered action of the spring biased rollers. Fixedly secured to opposite ends of member 90 is a pair of mounts 106 at which the extended rod 108 of cylinders 110 are attached. These cylinders have their upper ends attached to extentions 48' of frame member 48. Contraction of cylinders 110 causes pivoting of support member 90 to rotate the leaf springs and rollers around the pivotal axis, with the excess weight of the cantilevered rollers and springs being supported on hoist bar 102 which is simultaneously elevated by arms 100 pivoting with member 90. Contraction of cylinders 110 shifts rollers 96 from the active position astraddle the plane of plate 70, to the inactive partially elevated position extending outwardly over the conveyors roughly at a 45° angle as illustrated in phantom lines in FIG. 5. The roller subassemblies can also be shifted further to extend roughly parallel to the conveyors (FIG. 5) when it is desired to shift the knife subassemblies 22a and 22b out as shown in FIG. 5, as for blade honing or replacement. Roller assembly 24a and 24b are identical, being in mirror image relationship to each other. Likewise, blade subassemblies 22a and 22b are identical, also being in mirror image relationship to each other. Rollers 96, when in their active hog side engaging relationship astraddle the plane of movement of plate 70, are vertically beneath the cutting blades of the blade subassemblies 22a and 22b.

Figure 1:
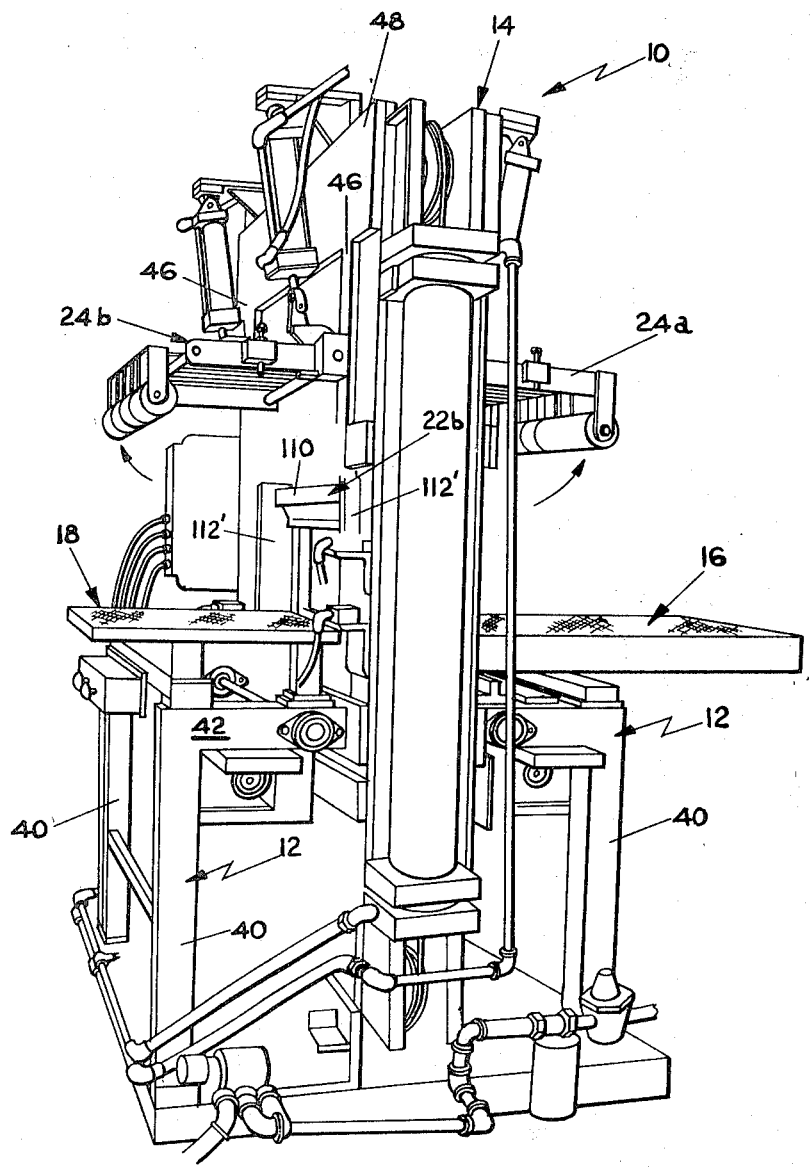
FIG. 1 is a perspective view of the novel skinning machine, viewed generally from one end with the infeed on the right and the out-feed on the left, as viewed.
Figure 7:
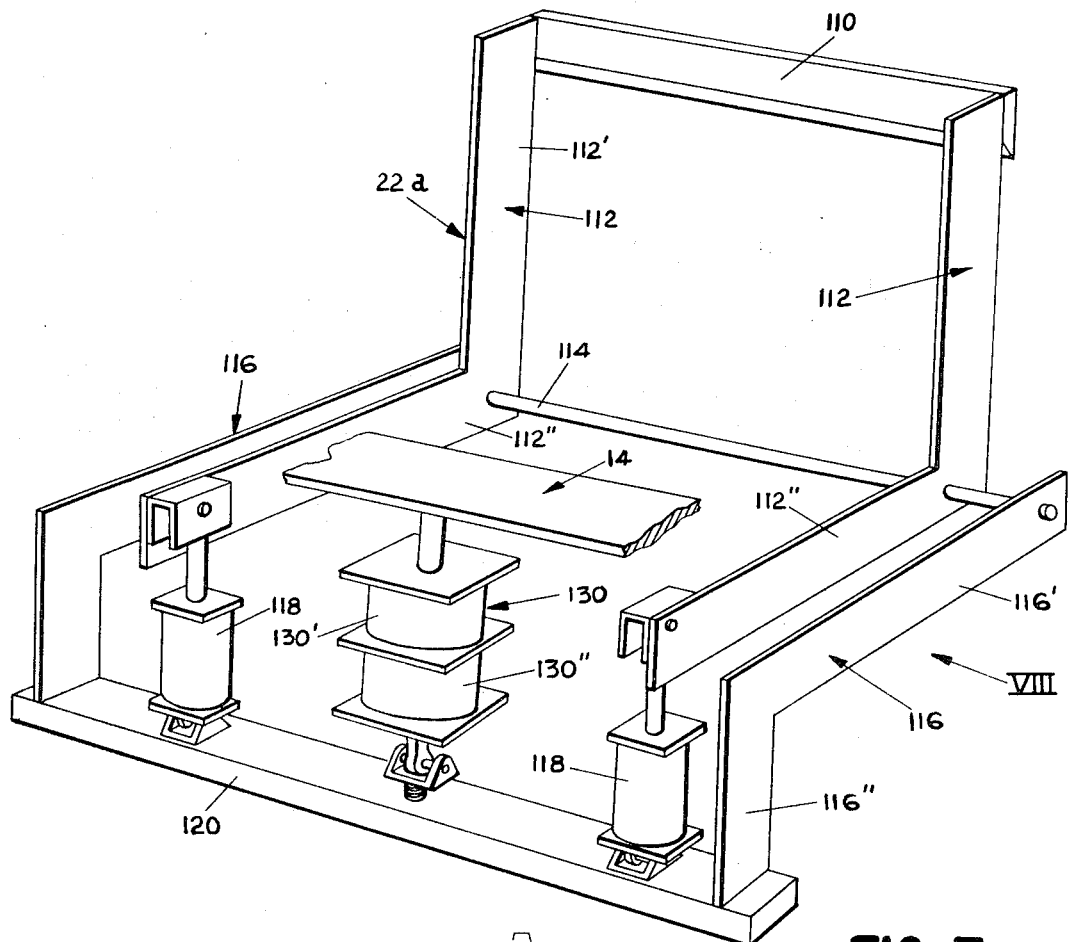
FIG. 7 is a fragmentary perspective view of one knife mounting and actuator subassembly.
Figure 8:
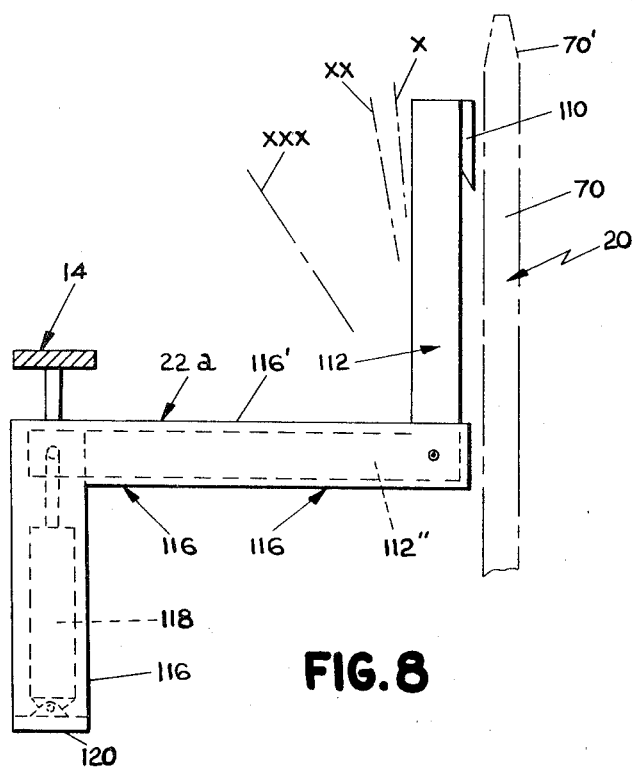
FIG. 8 is an end elevational view of the subassembly in FIG. 7, viewed from the direction VIII in FIG. 7.

Each blade subassembly, e.g., 22a illustrated in FIGS. 7 and 8, includes an elongated blade element 110 attached at its opposite ends to a pair of like L-shaped brackets 112, and specifically to the upper ends of the vertical leg 112' thereof. The horizontal legs 112'' of the brackets extend away from the plane of plate 70. Brackets 112 are mounted on a pivot shaft 114 to the outer ends of which a second pair of inverted L-shaped brackets 116 are pivotally attached at the inner ends of the horizontal legs 116' thereof. At the outer ends, i.e., those ends away from the plane of plate 70, of horizontal legs 112'' is attached a pair of fluid cylinders 118, the lower ends of such fluid cylinders being attached to a support member 120. To the ends of support member 120 are secured the lower ends of the vertical legs 116'' of brackets 116. Cylinders 118 are capable of causing a relative rotation between brackets 112 and 116 about shaft 114. These cylinders are normally retained in their extended position for positioning of blade 110 immediately adjacent the plane of travel of plate 70. Contraction of cylinders 118 pivots brackets 112 relative to brackets 116, shifting blade 110 away from plate 70 in a manner to be described in more detail hereinafter. Cylinders 118 are actuated only when blade 110 is to be tilted to a substantial position away from plate 70, as shown in FIG. 5 in phantom lines, as for sharpening (honing) of the blade, blade removal, or the like. To do this, it is necessary to first shift the pressure rollers outwardly to the position in FIG. 1, as will be explained. During normal operating conditions however, cylinders 118 are maintained in their extended position, achieving a fixed relationship between brackets 112 and 116.

Also attached to crossmember 120 of brackets 116, generally in the center thereof, is a piggyback cylinder assembly 130 which has a lower cylinder 130'' the piston rod of which is vertically adjustably attached to member 120, and which has a upper cylinder 130', the piston rod of which is pivotally attached to a fixed portion of frame 14. When blade 110 is in operating condition, both cylinders 130' and 130'' are retracted. Extension of cylinder 130' shifts brackets 112 to the first phantom line position illustrated at X in FIG. 8, thereby shifting blade 110 a small fraction of an inch away from its normal cutting position. Specifically, the blade is shifted an amount in the range of 25 to 250 thousandths of an inch, and preferably in the range of 70 to 125 thousandths of an inch, from its cutting position. This is done at skinning initiation as will be explained hereinafter. Fine adjustment of this amount can be achieved by adjusting position of member 120 with respect to cylinder assembly 130 as by a threaded shaft and collar unit 160, using a crank 162 or the equivalent. Extension of cylinder 130'' shifts bracket to the position XX in FIG. 8, shifting blade 110 further away, e.g., approximately 1 inch, from its effective cutting position. This is done at the end of the skinning stroke, as will be explained hereinafter. And, as noted previously, contraction of cylinders 118 shifts bracket 112 to the position XXX in FIG. 8, as for sharpening of the blade. In its cutting position, blade 110 is spaced a fraction of an inch, approximately equal to the thickness of skin on the side to be cut, from the flat planar surface of plate 70 adjacent thereto. This spacing may vary somewhat depending upon the characteristics of the side being skinned, and may be slightly greater than or less than the skin thickness.

Fine adjustment of the spacing of the individual blades with respect to plate 70 can be achieved with camming units 117 (FIG. 5) which are mounted between legs 116' of brackets 116 (FIG. 7) and frame 12 for controlled pivotal adjustment of the bracket assembly about shaft 114.

The apparatus is preferably controlled on at least a semiautomated basis using suitable controls and sequencing components. When a hog side is to be fed into the machine, plate 70 is in its lowered condition. Both conveyors 16 and 18 are started and the double hog side is placed skin down on the infeed conveyor 16.

Figure 3:
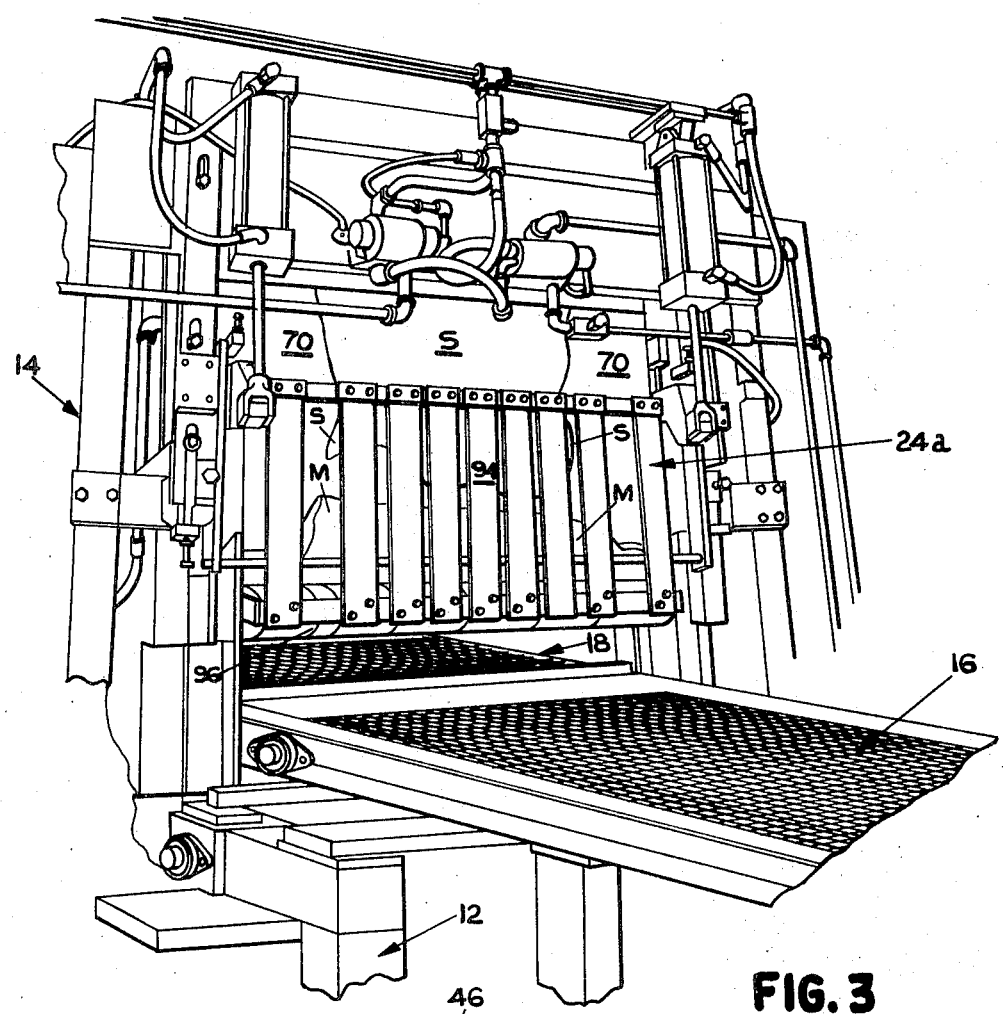
FIG. 3 is a fragmentary perspective view of the apparatus, viewed generally from the infeed side.

Conveyor 16 feeds hog side H (FIG. 5) into the assembly, and when its leading edge overlaps onto conveyor 18, both feed it in further until the hog side is basically midway between the apparatus, its center line, e.g., the back bone line if the hog side is double, lying along the upper edge 70' of plate 70. The hog side is positioned with the skin S down and the meat and fat back M up. With pressure rolls 96 in position astraddle the vertical plane of plate 70 (FIG. 5) and blades 110 closely adjacent but spaced a controlled distance from the plane of plate 70 (as in solid lines in FIG. 8). Plate 70 is shifted vertically upwardly by actuation of cylinders 78 to draw the cables upon which plate 70 is mounted. As the upper tapered edge 70' carries the hog side up between the pressure rolls 96, leaf springs 94 are caused to flex, applying resilient pressure against the hog side to force the skin flat against the opposite parallel lateral surfaces of plate 70. As the tapered forward edge of plate 70 and the animal side move in between blades 110, the blades are initially cocked outwardly away from their cutting position at a slight angle, shown in exaggerated form by the position X of brackets 112 in FIG. 8 by extension of cylinder 130'. It has been found important to position the blades in this position a small fraction of an inch away from the normal cutting position, during the cut initiation. After the nose of plate 70 passes the blade, cylinder 130' then is contacted, pulling blade 110 into its normal cutting position where it is spaced from the adjacent surface of plate 70 by approximately the thickness of the skin to be cut from the animal side, and preferably slightly less than this thickness to accommodate temporary lessening of the skin thickness with the skin stretching action occurring during the operation. As the hog side on plate 70 moves up between blades 110, the meat and fat back which is peeled from the skin curls up and is supported upon the inwardly projecting pressure rollers 96 and their brackets 95 which project toward plate 70 from the lower ends of leaf springs 94. The meat and fat back are thus supported basically between leaf springs 94, plate 70, and on top of rollers 96 during the skinning operation. When plate 70 reaches its upper most extent at the stroke, with skin S separated from meat M (FIG. 3), the skin S is draped over plate 70, and the two chunks of meat are retained as noted. Just prior to, during, or just after the lowering return movement of plate 70, pressure rollers 96 are shifted oppositely and outwardly to the 45° phantom line position illustrated in FIG. 5, thereby dropping the meat pieces onto the respective infeed and out-feed conveyors to advanced out of the machine after plate 70 is fully lowered. Also, just prior to the lowering return stroke of plate 70, cylinder 130' is extended to shift blades 110 to the position XX (FIG. 8) away from plate 70, preventing the blades from interferring with the skin on the lowering return stoke.

Suitable controls to govern the sequential operations of the apparatus are employed. These controls may use electrical sensors for fluid operators, for example. Such sensors can be a series of conventional limit switches. In other words, the upper and lower stop positions of the plate 70, as well as initiation of the shifting movements of the blades and rollers can be controlled with suitable limit switches including those designated 190, 192, 194, 196, and 198 (FIG. 6), associated with control valves and circuits.

Preferably, as plate 70 lowers, not only does clamp 71 shift away from plate 70 to open, but also a skin scraping discharge device is employed to release the lowering skin from one side of plate 70 and cause it to slide over the top edge of plate 70 and fall down on the other side between plate 70 and the adjacent conveyor to a suitable receptacle. The scraper-releaser can be of relatively simple structure. It preferably takes the form of a plate engaging bladelike element having a low-friction edge as of a lubricous polymer such as Teflon, nylon, or the like. It is biased toward one of the side faces of plate 70. It is oriented diagonally inwardly and upwardly so as to peel the lowering skin from the adjacent plate face, causing the skin to drop down on the opposite plate side. One suitable form of such a scraper-releaser is shown by device 180 with a scraper element 182 (FIG. 5) adjacent one lateral face of plate 70 and mounted on support means 184. Releasing the flap of skin overlying that side of the plate, and shifting it upwardly relative to plate 70 (as the plate lowers), causing it to slide up over the upper plate edge and fall on the opposite side of plate 70 due to gravity. Another suitable form of scraper-releaser which can be used instead of device 180 is a simple lubricous blade 201 (FIG. 5) oriented diagonally upwardly and inwardly toward the opposite face of plate 70, and attached to the inner end of conveyor 16. This of course would cause the skin to fall on the opposite side, to be discharged between plate 70 and the adjacent end of conveyor 18.

After plate 70 is lowered to its starting position below the level of conveyors 16 and 18, these conveyors are actuated to discharge the two pieces of separated meat (with some fat back attached) off conveyor 18. While both conveyors are operating, a fresh hog side to be skinned can be loaded on the outer end of infeed conveyor 16 to be advanced to the plate straddling position. At that time, clamp 71 closes and pressure roller units 24a and 24b are again lowered to hang freely until the passing hog side presses between rolls 96 and plate 70 to cause springs 94 to apply a flattening biasing force to portions of the sides just about to engage blades 110.

For single sides, only one set of blade and rollers need be employed if desired. In that case, the single side is fed into the assembly until the leading edge only is above edge 70' of plate 70, at which time vertically shiftable clamp is actuated to hold it to the shifting plate. The operation then proceeds as described previously, except that it occurs on only one side of plate 70.

During extensive experimental operation of this plate skinning machine, another significant factor was discovered. As noted previously, during the forced cutting separation of the meat from the skin, the flexible resilient skin tends to stretch. However, with some animal sides, it was found that the stretching tends to occur irregularly, causing gouges of skin to be cut out and left as patches on the meat. This obviously is very undesirable since it lowers the value of the skin, and also requires subsequent costly hand removal of the skin patches from the meat. In addition to this periodic problem, the skin stretching can also result in another result which is undesirable. Specifically, at the end of the skinning stroke, as the last bit of meat is cut from the skin, the stretched resilient skin periodically tends to spring back to its original form so rapidly that it springs up off plate 70 in a manner similar to a stretched rubber sheet. The misplaced skin tends to hang up in the machine, requiring temporary costly shut down for its removal.

Of these two noted factors, the first seems to result from excessive friction between the skin and plate during skinning, and the second seems to result from insufficient friction between the skin and plate after skinning. Surprisingly, it was discovered that both of these undesired occurrences could be brought under control by one step. Moreover, the step is easily and inexpensively performed by relatively simple additions to the equipment. Specifically, it was discovered that the application of a fluid agent, preferably aqueous, and typically plain water, to the faces of plate 70 prior to skinning solved both problems. By spraying water on the plate, skin to plate friction is controlled to result in regulated skin stretching, and also the water results in sufficient residual skin-to-plate friction (clinging) at the end of the skinning stroke to prevent springing skin release. The water can be applied by conventional spray nozzles 203 (FIG. 5) directed toward the opposite sides of plate 70, adjacent the inner ends of conveyors 16 and 18, and operable momentarily as plate 70 rises therepast.

Various additional features, advantages, and objects of this invention will become apparent to those in the art upon studying the foregoing description of the preferred embodiment set forth as illustrated. Also, it is entirely conceivable that minor variations may be made in certain of the features herein without departing from the concept presented. Hence, the invention is intended to be limited only by the scope of the appended claims, rather than by the specific details of the illustrated embodiment.

The embodiments of the invention in which an exclusive property or privilege is claimed are defined as follows.

1. Plate skinning apparatus for animal sides comprising: reciprocable plate means for advancing an animal side and reversing in a return stroke, and drive means therefore; animal side engageable biasing means arranged to bias an animal side against the surface area of said plate means; blade means adjacent said plate means, and blade mounting means supporting said blade means, to enable said blade means to sever meat from skin of a side advanced by said plate means; said blade mounting means being shiftable in a fashion to move said blade means controlled amounts toward and away from said plate means; said apparatus being characterized by blade position control means operably associated with said blade mounting means and operable to shift said blade means to a skinning initiation position and then to a skinning position, said blade means at said skinning initiation position being spaced from said feed plate means an amount greater than the thickness of a skin on the animal side, and said blade means at said skinning position being spaced from said feed plate means an amount approximately the thickness of a skin on the animal side.

2. The plate skinning apparatus in claim 1 wherein said blade position control means comprises controlled range power shift means.

3. The The plate skinning apparatus in claim 1 wherein said blade position control means includes means operable to shift said blade means to a third position away from said plate at the end of the plate upward stroke for return stroke of said plate.

4. The plate skinning apparatus in claim 2 wherein said blade position control means employs fluid cylinder means.

5. The plate skinning apparatus in claim 1 including second blade position control means operably associated with said blade mounting means and operable to retract said blade means a substantial distance from said feed plate means for blade honing or removal.

6. The plate skinning apparatus in claim 5 wherein said animal side engageable biasing means comprises spring biased roller means, and retractor means therefor operable to shift said roller means away from said plate means.

7. The plate skinning apparatus in claim 6 wherein said spring biased roller means includes a plurality of leaf springs extending along and spaced from said plate, roller mounting bracket means extending from said leaf springs toward said plate means, and a plurality of rollers mounted on said brackets; said leaf springs, bracket means, and rollers forming meat retention means until shifted away from said plate means.

8. The plate skinning apparatus in claim 1 wherein said side engageable biasing means includes portions on both opposite sides of said plate means, and said blade means and blade mounting means includes portions on both sides of said plate means.

9. Plate skinning apparatus for animal sides comprising: reciprocable plate means for advancing an animal side and reversing in a return stroke, and plate drive means therefor; animal side engageable biasing means arranged to bias an animal side against the surface area of said plate means; blade means adjacent said plate means, and blade mounting means supporting said blade means, to enable said blade means to sever meat from skin of a side advanced by said plate means; said apparatus being characterized by fluid applicator means directed to apply fluid on said plate means surface area prior to engagement of the skin of the animal side thereto for regulating skin stretching during skinning and skin springing from said plate means after skinning.

10. Plate skinning apparatus comprising: vertically oriented reciprocable plate means movable upwardly in an advance stroke, and downwardly in a return stroke, and power drive means therefor; blade means having sharp lower edge means adjacent said feed plate means; biasing roller means to bias an animal side against said feed plate means; roller mounting means supporting said roller means and defining meat retention means in cooperation with said roller means, said roller mounting means being shiftable between a first position with said roller means adjacent said feed plate means and a second position substantially away from said feed plate means, with said meat retention means being in a meat unloading condition in said second position.

11. The plate skinning apparatus in claim 10 including power shifting means operably connected to said roller mounting means for shifting such between said first and second positions.

12. The method of skinning an animal side comprising the steps of: clamping an animal side on an edge of a plate; positioning a blade adjacent said plate; initiating the advance of said plate in the direction of its said edge and past said blade while positioning said blade at a spacing from said plate somewhat greater than the thickness of the skin on the animal side during such plate advancement initiation, and then continuing said plate advancement, while shifting said blade to a spacing from said plate approximately the thickness of the skin during said continued advancement to the end of the plate stroke.

13. The method in claim 12 including the steps of: at the end of said plate stroke, shifting said blade away from said plate, and reversing said plate movement to its initial position.

14. The method of separating the skin and meat layers of an animal side comprising the steps of: positioning an edge of a plate adjacent the skin of the animal side, applying a fluid to the surface area of the plate, advancing the plate toward the animal side while causing the skin of the animal side to engage the plate surface area, and continuing to advance the plate with the animal side past blade means spaced from the plate approximately the thickness of the skin to slice the meat from the skin.

15. The method in claim 14 wherein said fluid is an aqueous fluid.

16. The method in claim 14 wherein said blade is retained at a spacing slightly less than the skin thickness.

* * * * *